(12) United States Patent
Dao

(10) Patent No.: US 6,304,803 B1
(45) Date of Patent: Oct. 16, 2001

(54) HVAC CONTROL SYSTEM FOR AN AUTOMOBILE

(75) Inventor: Hank Tien Dao, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/401,379

(22) Filed: Sep. 22, 1999

(51) Int. Cl.[7] .............................. G06F 7/00; G06F 17/00; G06F 19/00

(52) U.S. Cl. ..................................... 701/36; 701/1; 165/2; 165/22; 165/42; 165/43; 165/140; 165/202; 165/203; 165/205; 165/211; 165/265; 236/91 F; 236/91 C; 236/13; 236/49; 237/2 A; 237/12.3 B; 62/200; 62/244; 62/404; 62/408; 219/202-204

(58) Field of Search .............................. 701/1, 36; 165/2, 165/22, 42, 43, 140, 202, 203, 205, 211, 265; 237/2 A, 12.3 B; 236/91 F, 19 C, 13, 49; 318/64; 62/244, 200, 404, 408; 345/339, 126, 127; 219/202, 203, 204

(56) References Cited

U.S. PATENT DOCUMENTS

| | | | |
|---|---|---|---|
| Re. 36,437 | * 12/1999 | Hanson et al. | 123/179.4 |
| 4,343,230 | 8/1982 | Lundström | 98/205 |
| 4,470,270 | * 9/1984 | Takada et al. | 62/244 |
| 4,477,018 | 10/1984 | Rathegeber | 236/1 B |
| 4,856,710 | * 8/1989 | Takada et al. | 236/13 |
| 4,949,779 | * 8/1990 | Kenny et al. | 165/2 |
| 5,279,459 | * 1/1994 | Single, II | 237/2 A |
| 5,555,502 | * 9/1996 | Opel | 364/424.05 |
| 5,699,857 | * 12/1997 | Flaishans et al. | 165/202 |
| 5,771,702 | 6/1998 | Kawai et al. | 62/203 |
| 5,833,133 | * 11/1998 | Dage | 236/13 |
| 5,847,704 | * 12/1998 | Hartman | 345/339 |
| 6,175,782 | * 1/2001 | Obradovich et al. | 701/1 |

* cited by examiner

Primary Examiner—William A. Cuchlinski, Jr.
Assistant Examiner—Ronnie Mancho
(74) Attorney, Agent, or Firm—Rankin, Hill, Porter & Clark LLP

(57) ABSTRACT

A heating, ventilation, and air conditioning system for a vehicle including a front HVAC control system that communicates with a rear HVAC control system. The rear HVAC control system includes a control panel having mode, temperature, and blower speed controls. The front HVAC control system includes a control panel having a rear manual control switch for enabling/disabling manual control of the rear HVAC system via the rear HVAC control panel. A microprocessor communicates control information from the front HVAC control system to the rear HVAC control system regardless of the position of the rear manual control switch. Whether the supplied control information is used by the rear HVAC control system is determined by the rear manual switch.

14 Claims, 3 Drawing Sheets

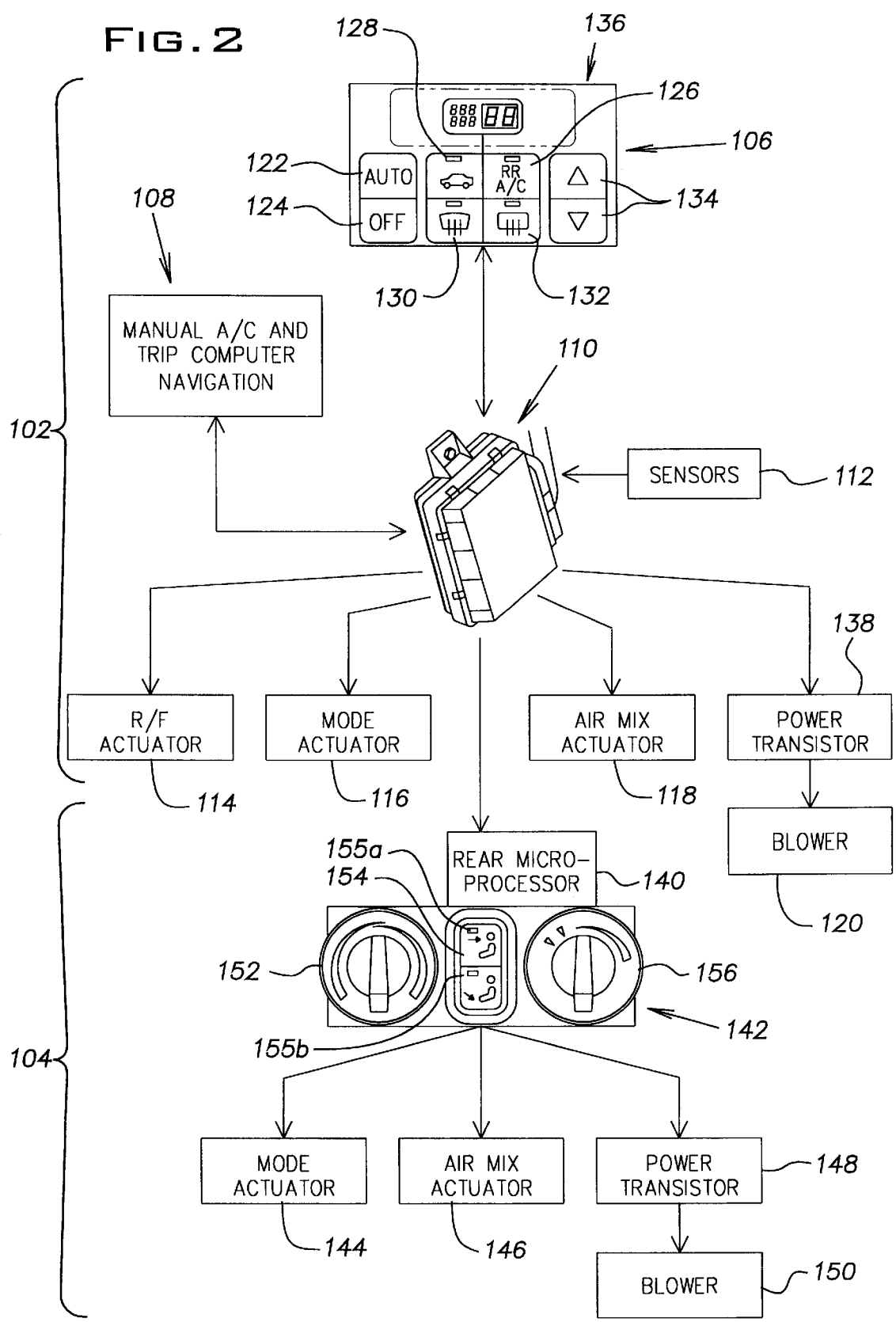

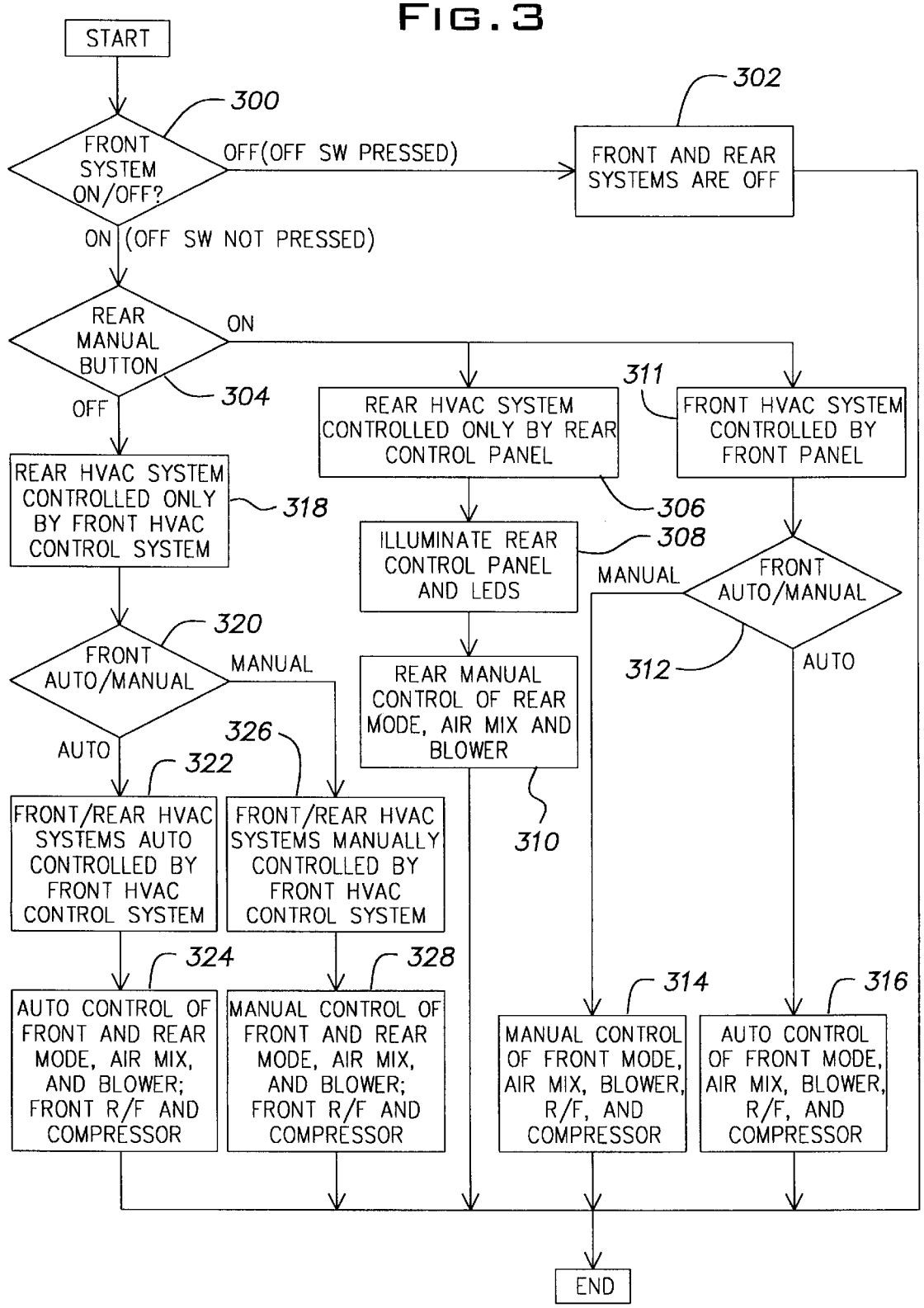

HVAC CONTROL SYSTEM FOR AN AUTOMOBILE

BACKGROUND OF THE INVENTION

1. Field of the Invention

The present invention is generally directed toward heating, ventilation, and air conditioning control systems and, more specifically, toward such control systems used in automobiles.

2. Description of Related Art

Automobile heating, ventilation, and air conditioning systems (hereafter HVAC systems) have conventionally included controls and vents located in or around the dashboard. However, as is well known to anyone who has been in a car having a conventional HVAC system, there is a significant difference in temperature between the front portion and the rear portion of the passenger compartment, especially on days with extreme conditions (hot, sunny days and cold days). Providing all of the vents at the front of the vehicle usually maintains uncomfortable temperature conditions for passengers in the rear portion of the vehicle. Alternatively, if an effort is made to make the rear passengers comfortable, the front passengers are over-heated or over-cooled.

Accordingly, HVAC controls and vents in a rear portion of the passenger compartment, which are in addition to the conventional HVAC controls and vents provided at the front portion of the passenger compartment, have been developed. Such a conventional automobile HVAC control system 10 including parallel front and rear HVAC control systems 12, 14, respectively, is illustrated in FIG. 1. The front HVAC control system 12 controls operation of a front HVAC system, which includes a heater core, a compressor, an evaporator, dampers, and a blower fan. The rear HVAC control system 14 controls operation of a rear HVAC system, which includes a heater core, an evaporator, dampers, and a blower fan. The front and rear heater cores are on the same fluid circuit. A compressor supplies refrigerant to both the front and rear evaporators.

The front HVAC control system 12 includes a multi-function front control panel 16, a damper, air conditioning, and blower control panel 18, a microprocessor 20, a plurality of actuators 22, 24, 26, sensors 28, a power transistor 30, and a blower 32, which is driven by the power transistor 30. The actuators include a recirculation/fresh air (R/F) actuator 22, a mode actuator 24, and an air mix actuator 26. The front panel 16 includes an automatic control setting button 34, recirculation/fresh air button 36, temperature set-point adjustment buttons 38, an off button 40, a front defrost button, a rear defrost button, and a display 42. The damper, air conditioning, and blower control panel 18 includes air flow direction buttons 44, blower speed control buttons 46, and air conditioning on/off buttons 48.

User-input operational parameters and sensed conditions are transmitted to the microprocessor 20. The microprocessor 20 controls the actuators 22, 24, 26 and power transistor 30 in accordance with the user inputs made via the front control panel 16 and the damper, compressor, and blower control switch panel 18 and, if in automatic mode, in accordance with a predefined control algorithm in response to sensed conditions. The sensed conditions include interior/exterior temperature, solar radiation, evaporator temperature, water temperature, and switch panel settings.

The rear HVAC control system 14 includes a rear manual switch 50 and a rear control panel 52. The rear manual switch 50 is disposed adjacent the front control panel 18 and alternatively enables or disables manual control over the rear HVAC system, thereby activating/deactivating the rear HVAC control system 14. The rear manual switch 50 is movable between a plurality of positions, including an off position, a rear manual control enabled position, vent/cold blower speed control positions, and heat/hot blower speed control positions.

Placing the rear manual switch 50 in the off position disables the rear HVAC system. Placing the rear manual switch 50 in the rear manual control enabled position permits manual control of the rear HVAC system via the rear control panel 52. Placing the rear manual switch 50 in any of the rear vent/cold and heat/hot blower speed control positions directly controls the rear HVAC system (mode and blower speed). Whether rear air conditioning is active (as opposed to vent) depends upon the condition of the auto button 34 on control panel 16 or the air conditioning buttons 48 on the damper, air conditioning, and blower speed control panel 18.

The rear control panel 52 includes a mode selector switch 54 and a blower speed selector switch 56. A mode actuator 60 receives signals from the mode selector switch 54 or the rear manual switch 50 to operate the rear HVAC system in the user-selected mode (vent/heat) and blower relays 62 are actuated by the blower speed selector switch 56 or the rear manual switch 50 to operate a blower 64 at the desired speed.

In the conventional HVAC control system, the rear HVAC system is either manually operable by the rear manual switch 50 or manually operable by the control panel 52, at the discretion of the front passengers. In this arrangement, the front and rear HVAC control systems 12, 14 are truly parallel, with no communication of operating instructions between the front and rear HVAC control systems 12, 14.

The foregoing conventional HVAC control system 10 suffers from a number of disadvantages. Since the front and rear control systems 12, 14 are in parallel, and there is no communication between the front and rear HVAC control systems 12, 14. Also, modern front HVAC control systems 12, such as the one illustrated in FIG. 1, have the automatic control setting wherein compressor activation (A/C), air mix (temperature), mode of operation (vent/heat), recirculation/fresh air, and blower speed are controlled such that cabin temperature matches or tracks a user-defined temperature set point in response to sensed conditions (i.e., interior/exterior temperature, solar radiation, etc.). The automatic control setting operates under a control algorithm based upon pre-defined experimental models, and is typically tuned or customized to match the physical characteristics (i.e., cabin size, glass area, insulation properties) of the subject automobile. Since the conventional rear HVAC control system 14 is not in communication with the front HVAC control system 12, automatic operation or control of the rear HVAC system is not possible with the conventional control arrangement.

Therefore, there exists a need in the art for an automobile HVAC control system that provides the front passengers with improved control over the rear HVAC system. There also exists a need in the art for a rear HVAC control system that is operable in an automatic mode in response to sensed environmental conditions. Finally, there exists a need in the art for front and rear HVAC control systems that permit better control over cabin temperature while permitting front and rear passengers to manually control the HVAC system to satisfy individual temperature requirements.

SUMMARY OF THE INVENTION

The present invention is directed toward an HVAC control system for an automobile that provides communication of control instructions between a front HVAC control system and a rear HVAC control system. The present invention is also directed toward a combined front and rear HVAC control system wherein a control setting (manual/automatic) of the rear HVAC control system is controlled by front passengers in the automobile. The present invention is further directed toward a rear HVAC control system which is operable in a manual and an automatic control setting, and toward a rear HVAC control system that uses operating instructions from the front HVAC control system when operating in the automatic control setting.

In accordance with the present invention, a front HVAC control panel includes a rear manual switch that alternatively turns on or off the manual controls of the rear HVAC control panel. A rear HVAC control panel includes temperature, mode, and blower speed controls. A front microprocessor communicates control information from the front HVAC control system to the rear HVAC control system. The control information is supplied to the rear HVAC control system regardless of whether manual control of the rear HVAC control system is enabled. Whether the supplied control information is used by the rear HVAC control system is determined by the position (on/off) of the rear manual switch.

In further accordance with the present invention, when the rear manual switch is in the "on" position, manual operation of the rear HVAC system is enabled and the rear HVAC control system ignores the control information supplied by the front microprocessor. In this situation, the rear passengers are permitted to manually control the rear HVAC system via the rear HVAC control panel. Visual indication that manual control of the rear HVAC system via the rear HVAC control panel is enabled is provided to the rear passengers by illumination of the rear HVAC control panel mode LED indicators and back-lighting of the rear HVAC control panel. The degree of illumination of the rear HVAC control panel mode LED indicators corresponds to the condition of the headlight switch such that when the headlight switch is off (day time) the degree of illumination is greater than when the headlight switch is on (night time). While the rear HVAC control system is manually controlled by the rear control panel, the front HVAC system can be in either the manual or automatic control setting, as desired.

In further accordance with the present invention, when the rear manual switch is in the "off" position, manual control over the rear HVAC system via the rear control panel is not permitted, the rear HVAC control panel mode LED indicators are not illuminated and the rear HVAC control panel is not back-lit or illuminated. Having the rear HVAC control panel and rear HVAC control panel LED mode indicators dark or unilluminated indicates to the rear seat passengers that manual control over the rear HVAC system via the rear HVAC control panel is not permitted. In this situation, the rear HVAC system is controlled by the front HVAC control system. If the front HVAC system is operated in the manual control setting, the rear HVAC system is controlled manually by the front HVAC control system settings. If the front HVAC system is in the automatic control setting, the rear HVAC system is likewise in the automatic control setting, with the rear microprocessor using the control information supplied to it by the front microprocessor. The front microprocessor, in turn, derives the control information using a control algorithm in response to sensed environmental conditions and user input.

BRIEF DESCRIPTION OF THE DRAWINGS

These and further features of the present invention will be apparent with reference to the following description and drawings, wherein:

FIG. 2 schematically illustrates an automobile HVAC control system according to the present invention; and, FIG. 3 is a flow chart illustrating operation of the HVAC control system according to the present invention.

DETAILED DESCRIPTION OF THE PREFERRED EMBODIMENT

Figure 1:
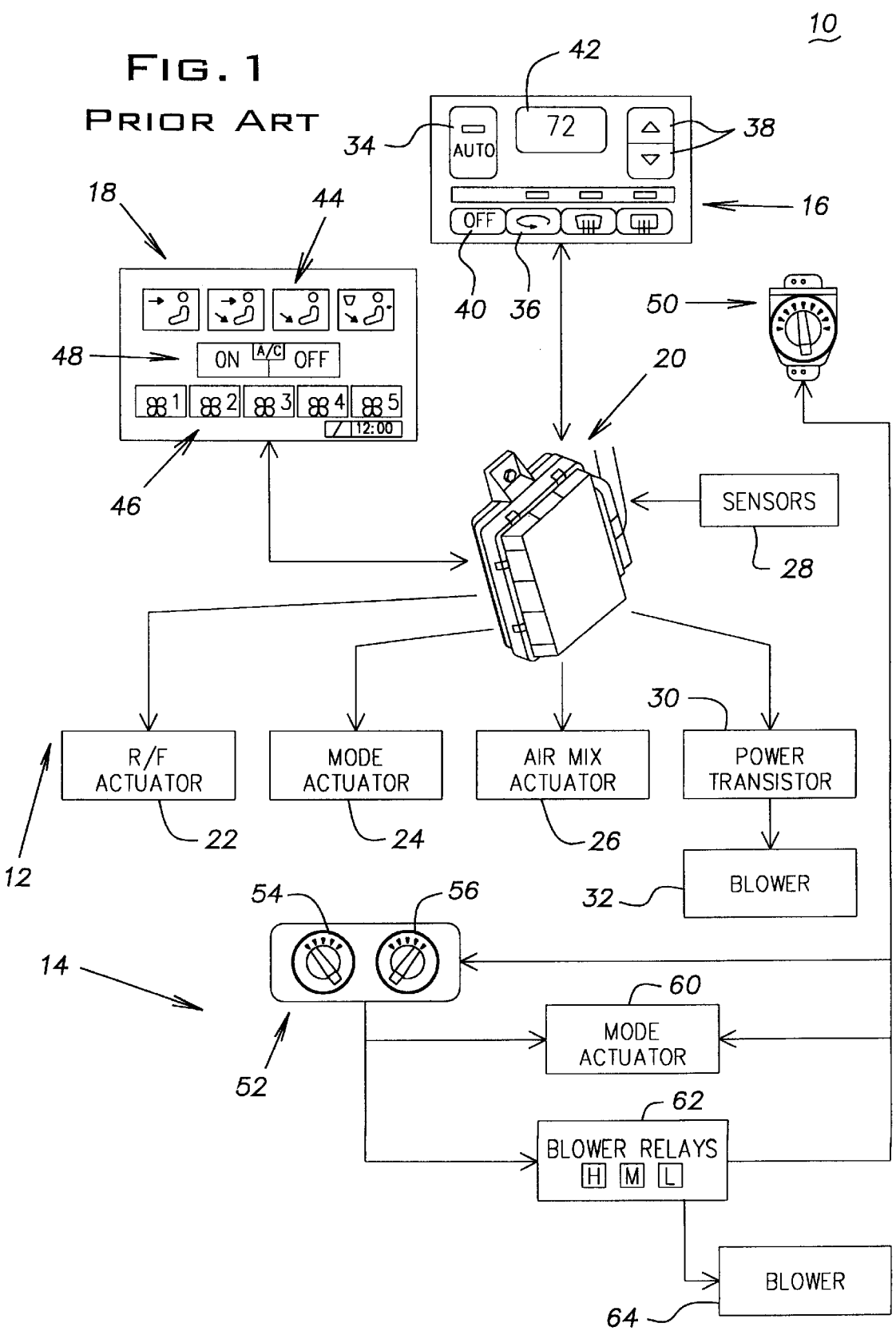
FIG. 1 schematically illustrates a conventional automobile HVAC system wherein front and rear HVAC control systems are in parallel.

With reference to FIG. 2, an automobile HVAC control system 100 according to the present invention is schematically illustrated. The HVAC control system 100 includes a front HVAC control system 102 and a rear HVAC control system 104. The front HVAC control system 102 controls a front HVAC system, and has controls and vents disposed in or around the front dashboard (and, optionally, floor vents for the rear passengers). The rear HVAC control system 104 controls a rear HVAC system, and has controls mounted in a position accessible to rear passengers and a plurality of vents for the rear passengers (and, optionally, further vents for third-row passengers).

The front HVAC system includes a compressor, a heater core, an evaporator, actuators, sensors, and a blower fan. The rear HVAC system includes a heater core, an evaporator, actuators, and a blower fan. The front and rear heater cores are preferably on the same fluid circuit. The compressor preferably supplies refrigerant to both the front and rear evaporators. It is considered apparent that several interchangeable automobile HVAC systems are well known in the art. Insofar as the present invention is directed toward systems and methods for controlling operation of such conventional HVAC systems, application of the present invention is not limited to any particular HVAC system, and specific HVAC system structure will not be further discussed hereinafter.

With continued reference to FIG. 2, the front HVAC control system 102 includes a front control panel 106, a manual air conditioning and trip computer/navigation control panel 108, a microprocessor 110, sensors 112, a power transistor 138, a recirculation/fresh air (R/F) actuator 114, a mode actuator 116, an air mix actuator 118, and a blower 120.

The front control panel 106 includes an automatic control setting button 122, an off button 124, a rear manual button 126, a recirculation/fresh air (R/F) button 128, a front defrost button 130, a rear defrost button 132, and buttons 134 for incrementally increasing/decreasing a temperature set point. The front control panel 106 also includes a display 136 for showing operating conditions, such as the temperature (set point) and the operational setting (manual/automatic).

The manual air conditioning and trip computer/navigation control panel 108 preferably includes a touch screen or push buttons (not shown) for controlling fan speed, mode control (vent selection), compressor activation (A/C on/off) and a display for showing operating conditions of the automobile, such as ambient temperature, active vents, blower speed, miles per gallon, distance traveled, elapsed trip time, etc.

The sensors 112 detect environmental and operating conditions, and preferably include at least one radiation sensor for detecting the level of solar radiation or load, a sensor for detecting interior temperature, a sensor for detecting exterior temperature, a sensor for detecting evaporator temperature, and a sensor for detecting water temperature. Naturally, other sensors for-detecting additional conditions of interest, such as oil pressure, engine temperature, fuel level, and humidity, may also be provided.

Two-way communication is provided between the front microprocessor 110 and the front control panel 106 and the manual air conditioning and trip computer/navigation control panel 108, as illustrated by the double headed arrows in FIG. 2. The front microprocessor 110 controls operation of the front HVAC system in response to detected operating conditions and user inputs. The front microprocessor 110 has a stored algorithm or software program for controlling the front HVAC system, when in the automatic control setting, in response to sensed conditions so as to have the detected temperature track or match a desired, user-input temperature set point. The software program is preferably tuned to the physical characteristics (i.e., cabin size, glass area, insulation) of the subject automobile to optimize control and response time of the front HVAC system based upon sensed environmental conditions (i.e., interior/exterior temperature, ambient solar radiation, evaporator temperature, water temperature, etc.), and user input (desired or set point temperature). Since software programs for automatically controlling automobile HVAC systems are known in the art, and the present invention is not limited to any specific control algorithm, such programs will not be discussed further hereinafter.

The front microprocessor 110 controls the various actuators 114, 116, 118 in accordance with the user inputs, sensed conditions, control setting (manual/automatic), and mode of operation. The front microprocessor 110 also controls a power transistor 138 so as to have the front blower 120 operate at a user-selected speed when in the manual control setting, or to operate at a speed determined by the software program when in the automatic control setting. Preferably, the blower speed is infinitely adjustable.

The front microprocessor 110 also communicates control information to the rear HVAC control system 104 and, more specifically, to a rear microprocessor 140 provided by the rear HVAC control system 104. As will be described more fully hereinafter, the front microprocessor 110 provides the control information to the rear microprocessor 140 regardless of the condition of the rear manual switch 126 (i.e., whether rear manual control is enabled/disabled) and the control setting (manual/automatic) of the front HVAC control system 102.

The rear HVAC control system 104 includes, in addition to the rear microprocessor 140, a rear control panel 142, a mode actuator 144, an air mix actuator 146, a power transistor 148, and a blower 150, which is driven by the power transistor 148. The rear control panel 142 includes a temperature adjusting dial 152, a mode (vent) selection switch 154, and a blower speed dial 156. The rear control panel 142 is back-lit only when manual control of the rear HVAC control system is enabled and the headlight switch is on. The mode selection switch 154 includes mode LED indicators 155a, 155b that are individually illuminated, when rear manual control is enabled, to identify the active vents. Preferably, the illumination level of the LEDs 155a, 155b are controlled such that, when the headlight switch is turned on (i.e., night time), the LEDs 155a, 155b are at a lower illumination level than when the headlight switch is turned off (day time).

The mode actuator 144 responds to the mode selection switch 154, and is operable to control a damper (not shown) that directs output air flow to the desired vents. In the illustrated embodiment either lower, floor vents or upper, face vents may be selected. The air mix actuator 146 is operable to control a damper (not shown) that directs air from the blower and evaporator through the rear HVAC system heater core before exiting to the passenger compartment via the vents selected using the mode selector switch 154. Accordingly, the air mix or temperature may be infinitely adjusted using the temperature adjusting dial 152 from a cold position, wherein virtually no air passes through the heater core, to a hot position, wherein virtually all air passes through the heater core. Since the front and rear evaporators are preferably on the same fluid circuit, whether rear HVAC system air conditioning is available is controlled by the front HVAC control system and, more specifically, by the compressor activation of the manual air conditioning and trip computer/navigation control panel 108.

As will be discussed more fully hereinafter with reference to the method of operating the HVAC control system 100 according to the present invention, when rear manual control over the rear HVAC control system 104 is enabled, the rear microprocessor 140 transmits control information to the mode actuator 144, the air mix actuator 146, and the power transistor 148 to control the operation of the rear HVAC system in accordance with the user's inputs provided via the rear HVAC control panel 142.

Alternatively, when rear manual control is disabled, and the front HVAC system is operated in the automatic control setting, the rear HVAC system is likewise operated in the automatic control setting utilizing the control information provided by front microprocessor 110. The algorithm control information, which is transmitted from the front microprocessor 110 to the rear microprocessor 140, is used to control operation of the actuators 144, 146 and the power transistor 148. The rear microprocessor 140 may use the control information directly, or may implement a predetermined secondary control algorithm to scale the received control information to further tune the HVAC system to physical characteristics of the subject automobile.

Further, when rear manual control is disabled, and the front HVAC system is operated in the manual control setting, the rear HVAC system is likewise operated in the manual control setting but in accordance with the user's inputs made via the front control panel 106 and the manual air conditioning and trip computer/navigation control panel 108. In this situation, the manual inputs made via the front HVAC control system 102, which are transmitted from the front microprocessor 110 to the rear microprocessor 140, are used by the rear microprocessor 140 to control operation of the actuators 144, 146 and the power transistor 148.

With reference to FIG. 3, a method for operating the automobile HVAC control system 100 according to the present invention is illustrated. Although the flow chart of FIG. 3 includes a "start" and an "end", it is considered apparent that FIG. 3 is intended to indicate a single pass through the control method according to the present invention. Naturally, the user input devices are continuously monitored for a change in the condition of the switch inputs (auto, off, r/f, def, mode, fan, A/C, etc.).

Initially, in step 300 the condition of the front system off button 124 on the front control panel 106 is determined. If the off button 124 is in the off position, the front and rear HVAC control systems are turned off (step 302). If the condition of any of the various switch inputs changes, the off button 124 is preferably turned to the on position.

If the off button is not depressed (i.e., the front system is on) then, in step 304, the condition of the rear manual button 126 is determined. If the rear manual button 126 is on, then manual control over the rear HVAC system via the rear HVAC control panel 142 is enabled (step 306). In this case, the rear microprocessor 140 disregards or ignores the control information transmitted by the front microprocessor 110 and, instead, utilizes the manual inputs via the rear control panel 142. Accordingly, the rear HVAC system is entirely manually controlled by the rear seat passengers. The rear control panel 142 is back-lit (assuming that the headlight switch is on), and one of the rear control panel mode LED indicators 155a, 155b is illuminated (step 308) to identify the active vents and to indicate to the rear passengers that they may manipulate the temperature adjusting dial 152, mode selection switch 154, and blower speed dial 156 to alter the mode, air mix, and blower speed of the rear HVAC system (step 310).

While the rear HVAC system is being manually controlled by the rear control panel, the front HVAC system is controlled by the front panel (step 311). The front HVAC system may be either manually controlled or automatically controlled. If the automatic control setting button 122 is not depressed (i.e., in the "manual" or non- automatic position) the front seat passengers may manually control the operation of the front HVAC system to control the mode (vent), air mix (temperature), recirculation/fresh air, compressor activation (A/C), and blower speed (step 314). Alternatively, if the automatic button is depressed (i.e., in the "automatic position"), the mode (vent), air mix (temperature), recirculation/fresh air, compressor activation (A/C), and blower speed are automatically controlled in accordance with the control algorithm stored in the front microprocessor in response to sensed conditions and user input (step 316), as discussed hereinbefore. Accordingly, when the rear manual button 126 is on, the front and rear HVAC systems are controlled independently of one another, thereby providing the front and rear passengers with better control over their respective temperature conditions.

With reference to step 304, if the rear manual button 126 is in the off position, manual control over the rear HVAC system via the rear control panel 146 is disabled, and the rear HVAC system is entirely controlled by the front HVAC control system (step 318). Accordingly, the rear control panel 142 is not illuminated, and the rear HVAC control panel mode LED indicators 155a, 155b are turned off, thereby indicating to the rear passengers that changing the settings of the rear panel control devices will be ineffective.

In step 320, the condition of the automatic control setting button 122 is checked. If the setting is automatic, the front and rear HVAC systems are automatically controlled by the front HVAC control system 102 (step 322). Accordingly, the rear microprocessor 140 uses the control information supplied by the front microprocessor 110 to control the mode selection (vent activation), air mix (temperature), and blower speed. The front microprocessor control information, which is derived, as noted hereinbefore, from a control algorithm in response to user input and sensed environmental conditions, also controls the front HVAC system mode (vent), air mix (temperature), recirculation/fresh air, compressor activation (A/C), and blower settings (step 324).

Alternatively, if in step 320 the control setting is "manual", the front and rear HVAC systems are both manually controlled by user input via the front HVAC control system (step 326). User input control settings are used by the front microprocessor 110 to control the mode, air mix, recirculation/fresh air, compressor activation (A/C), and blower of the front HVAC system, and are used by the rear microprocessor 140 to control the mode, air mix, and blower speed of the rear HVAC system (step 328).

Preferably, each time the automobile is started, the rear manual switch is reset to the off position, while the other control inputs remain in their prior condition. Also, illumination of the rear control panel 142 and mode LED indicators 155a, 155b is coordinated with the condition of the front headlight switch such that, assuming that the rear manual button 126 is in the on position, the mode LED indicators 155a, 155b are illuminated at higher levels during day time (headlights off) than at night (headlights on). The rear control panel 142 is back-lit when the rear manual button 126 is in the on position and the headlight switch is on. As noted hereinbefore, when manual control over the rear HVAC system via the rear control panel is disabled, the rear control panel 142 is not back-lit, and the mode LED indicators 155a, 155b are not illuminated.

While the preferred embodiment of the present invention is shown and described herein, it is to be understood that the same is not so limited but shall cover and include any and all modifications thereof which fall within the purview of the present invention as defined in the claims appended hereto.

What is claimed is:

1. A control system for an automobile heating, ventilation, and air conditioning (HVAC) system, said HVAC system comprising a front HVAC system and a rear HVAC system, comprising:

a rear control system having a plurality of switches for manually controlling operation of the rear system;

a front control system having a plurality of switches for manually controlling operation of the front system and for selectively manually controlling operation of said rear system;

a microprocessor that is operable to transmit control information from said front control system to said rear control system;

a control switch that selectively enables said rear control system switches such that, when said control switch is in a first position, said rear control system switches control operation of said rear system and said control information from said microprocessor is ignored and, when said control switch is in a second position, said rear system is manually controlled by said front control system switches in accordance with said control information supplied from said microprocessor.

2. The system according to claim 1, wherein said rear control system further comprises a rear switch light, said rear switch light being turned on when said control switch is in said first position to indicate to a user of said rear control system that manual control over said rear control system is enabled.

3. The system according to claim 1, wherein said control switch is a user-operated switch in said front control system.

4. The system according to claim 1, wherein said front control system further comprises a switch for enabling automatic control over temperature based upon sensed environmental conditions and, wherein, when said switch for enabling automatic control over temperature is activated and said control switch is in said second position, the rear system is automatically controlled by said front control system.

5. The system according to claim 1, wherein the rear control system includes a mode indicator, said mode indicator being turned on when said control switch is in said first position and being turned off when said control switch is in said second position.

6. A method for controlling an automobile heating, ventilation, and air conditioning (HVAC) system, said HVAC system including a front HVAC system and a rear HVAC system, said control system comprising a front HVAC control system and a rear HVAC control system, said rear HVAC control system including a control panel having switches for manual operation of said rear HVAC system, said front HVAC system including a control panel having switches for controlling operation of said front HVAC system and a rear manual switch for selectively enabling and disabling manual control of said rear HVAC system via said rear HVAC system control panel, the method comprising the steps of:

communicating control information from said front HVAC control system to said rear HVAC control system;

using said control information to operate said rear HVAC system when said rear manual switch is in a second position; and, ignoring said control information and enabling manual control of said rear HVAC system via said rear HVAC control panel when said rear manual switch is in a first position.

7. The method according to claim 6, wherein said rear HVAC system control panel includes a light, the method comprising the further step of:

illuminating said light only when said rear manual switch is in said first position.

8. The method according to claim 6, wherein said front HVAC control system includes a first microprocessor, said first microprocessor being operable to derive control information based upon user's inputs and sensed operating conditions, said first microprocessor sending said control information from said front HVAC control system to said rear HVAC control system, said rear HVAC control system including a second microprocessor for receiving said control information from said first microprocessor, said second microprocessor being operable, when said rear manual switch is in said second position, to operate said rear HVAC system based upon said control information.

9. The method according to claim 8, wherein said front HVAC control system is operable in a manual control setting and an automatic control setting and, wherein, when said rear manual switch is in said second position, a control setting of said rear HVAC control system is identical to that of said front HVAC control system.

10. A control system for an automobile heating, ventilation, and air conditioning (HVAC) system, said HVAC system comprising a front HVAC system and a rear HVAC system, comprising:

a rear control system having a plurality of switches for manually controlling operation of the rear system;

a front control system having a plurality of switches for manually controlling operation of the front system and for selectively manually controlling operation of said rear system;

a microprocessor that is operable to transmit control information from said front control system to said rear control system;

control means for selectively enabling said rear control system switches such that, when said control means is in a first operating condition, said rear control system switches control operation of said rear system and said control information from said microprocessor is ignored and, when said control means is in a second operating condition, said rear system is manually controlled by said front control system switches in accordance with said control information supplied from said microprocessor.

11. The system according to claim 10, wherein said rear control system comprises a rear switch light, said rear switch light being turned on when said control means is in said first operating condition to indicate to a user that rear manual control over said rear control system is enabled.

12. The system according to claim 10, wherein said control means comprises a user-operated switch in said front control system, said first operating condition being a rear manual control enabled position of said user-operated switch and said second operating condition being a rear manual control disabled position of said user-operated switch.

13. The system according to claim 10, wherein said front control system further comprises a switch for enabling automatic control over temperature based upon sensed environmental conditions and, wherein, when said switch for enabling automatic control over temperature is activated and said control means is in said second operating condition, the rear system is automatically controlled by said front control system.

14. The system according to claim 10, wherein said rear control system comprises a mode indicator, said mode indicator being turned on when said control means is in said first operating condition and being turned off when said control means is in said second operating condition.

* * * * *